Jan. 10, 1967 P. L. BLACKSHEAR, JR., ET AL 3,296,865
HEAT SENSING PROBE AND PROCESS
Filed Nov. 14, 1963 2 Sheets-Sheet 1
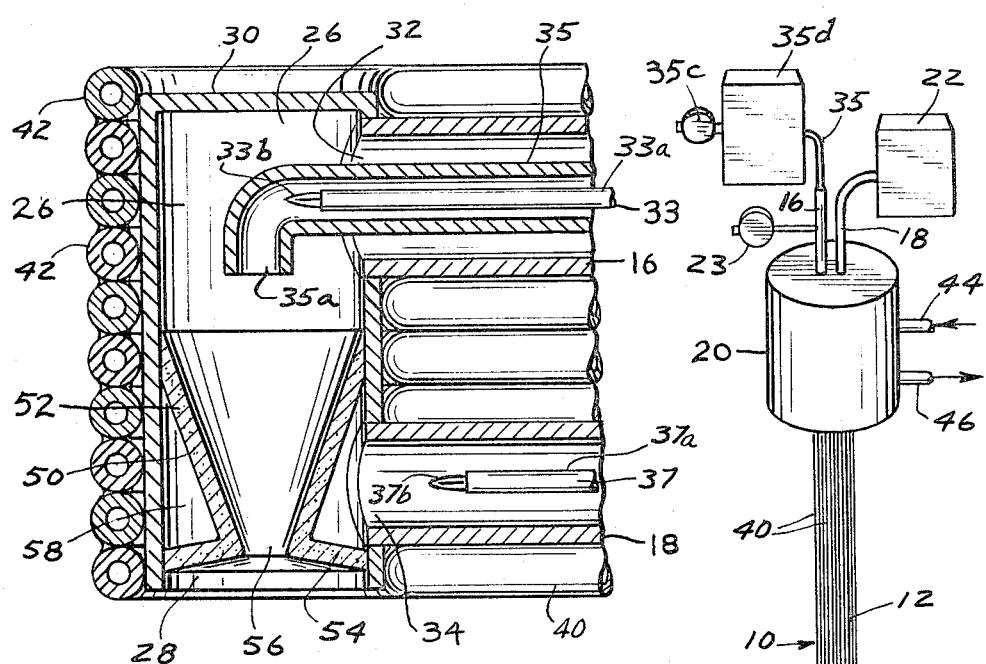
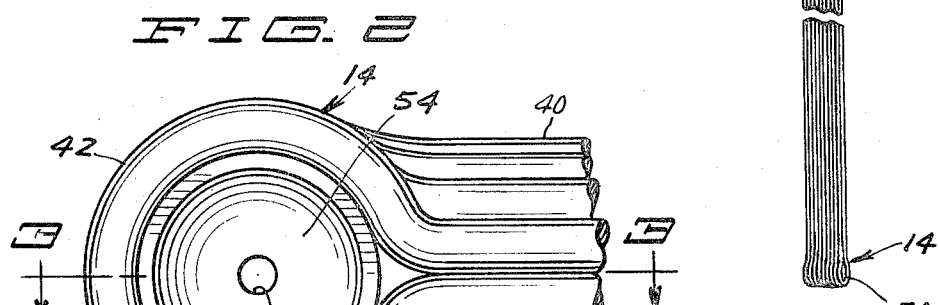
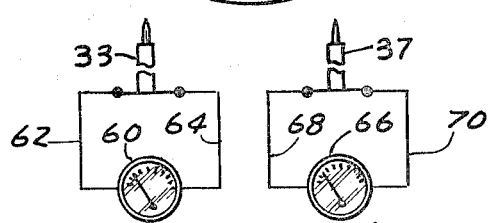
INVENTORS
PERRY L. BLACKSHEAR JR.
BY FRANK D. DORMAN
Moore White & Burd
ATTORNEYS Jan. 10, 1967  P. L. BLACKSHEAR, JR., ET AL  3,296,865
HEAT SENSING PROBE AND PROCESS
Filed Nov. 14, 1963  2 Sheets-Sheet 2
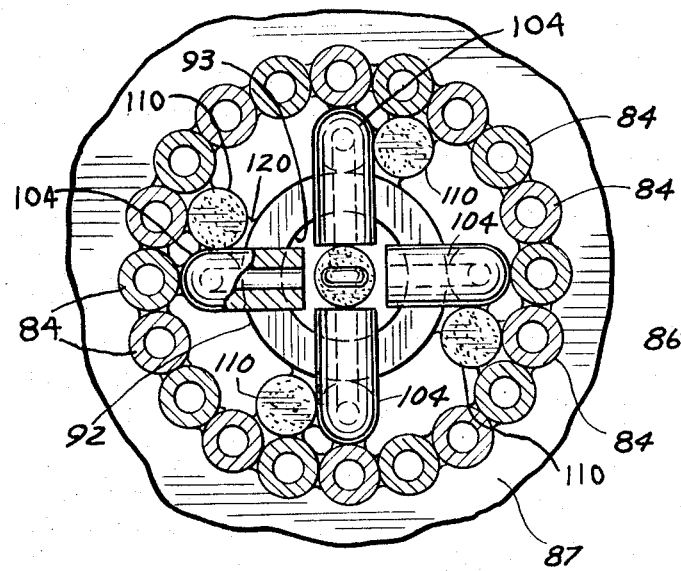
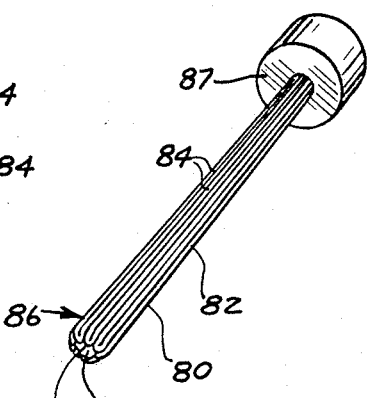
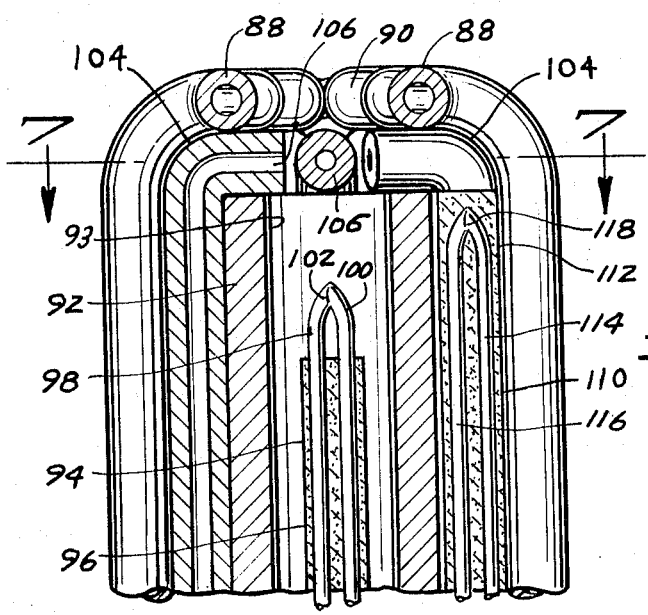
INVENTORS
PERRY L. BLACKSHEAR JR.
BY FRANK D. DORMAN
Moore White + Burd
ATTORNEYS

United States Patent Office 3,296,865
Patented Jan. 10, 1967

3,296,865
HEAT SENSING PROBE AND PROCESS
Perry L. Blackshear, Jr., Mahtomedi, and Frank D. Dorman, St. Paul, Minn., assignors to The Regents of the University of Minnesota, Minneapolis, Minn., a corporation of Minnesota
Filed Nov. 14, 1963, Ser. No. 323,780
13 Claims. (Cl. 73—359)

The present invention relates to measuring and testing equipment and more particularly to an improved apparatus and process for collecting and measuring the temperature of a gas. While the invention has a variety of applications, it is particularly useful for measuring the temperature of the efflux gases of propulsion engines such as turbojet and rocket engines.

For the past several years, a continuous effort has been made to extend the maximum temperature capabilities of temperature sensors. The problem of determining properties of gases becomes increasingly difficult as the gas enthalpy or heat content is increased. For example, temperature is ordinarily measured by permitting an element with a temperature sensitive property to come into equilibrium with the environment being tested. In general, this procedure cannot be used when the temperature to be measured is above the melting point of available materials.

Optical techniques have a distinct advantage for such applications since their use enables temperature to be measured from a remote location. However, making local measurements in hot gases and correctly interpreting results has proven difficult to accomplish with optical systems. In other sensing instruments of the type described the time required for sensing a change in temperature is far in excess of that desired.

The sensing probe of the present invention is an immersion instrument for measuring the temperature of a gas without coming into equilibrium with the test environment. This permits local measurements while putting no theoretical limit on the maximum temperature which can be measured. In fact, the sensing probe of the present invention is designed to measure the temperature of a gas which is hot enough to melt the materials from which it is constructed and provision is made to prevent the heat from melting or otherwise damaging the probe as the sample is collected.

Briefly stated, the apparatus of the present invention includes an elongated probe body having cooling means extending along its length for removing heat from the surface thereof. A port is provided in the probe through which a sample of ambient gas is collected and a duct means is provided for conveying a relatively cool diluent gas to the region at which the ambient gas enters the port. Specifically, a gas serves to cool the probe by transpiration through a foraminous or perforate member which communicates with the external environment to form a layer of relatively cool gas surrounding the inlet port and thereby preventing damage to the port and interior of the probe from the heat of the surrounding gases.

In the preferred process of performing the invention, the hot gas to be sampled is mixed with a cold or relatively cool diluent gas of a known initial enthalpy. The temperature of this mixture is measured as it is collected. The mass fraction of the diluent gas in the sample is measured and from this information the enthalpy of the ambient gas is calculated.

It is therefore one object of the present invention to provide an improved heat sensing probe of the type described including a means for reliably cooling the exterior of the probe so that the probe will not be damaged by the heat of the surrounding gas.

Another object of the invention is the provision of a temperature sensing probe which will exhibit a time response of as little as .001 second.

A further object of the present invention is the provision of an improved probe of the type described which is rugged in construction, reliable in operation, can be manufactured at a reasonable cost and will reliably permit the sensing of relatively hot gases.

Yet another object of the present invention is the provision of an improved heat sensing probe including a chamber for mixing together a relatively cool diluent gas with a relatively hot gas and a distribution means communicatively associated with the source of diluent gas and the chamber for distributing a portion of the diluent gas to the exterior of the chamber thereby preventing the heat of the surrounding gases from damaging portions of the probe.

Another object of the present invention is the provision of an improved probe of the type described which will reliably permit samples of hot gases to be collected and the temperature thereof determined and which can at the same time be made small in size so as to permit insertion of the probe into relatively small spaces.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the accompanying drawings in which the same numerals refer to corresponding parts and in which:

FIGURE 1 is a perspective view of one form of probe in accordance with the present invention;

FIGURE 2 is a side elevational view of the end portion of the probe of FIGURE 1;

FIGURE 3 is a partial transverse sectional view taken on line 3—3 of FIGURE 2;

FIGURE 4 is a circuit diagram illustrating the circuits for the thermocouples in accordance with the invention;

FIGURE 5 is a perspective view of another form of probe in accordance with the present invention;

FIGURE 6 is a central longitudinal sectional view of the end of the probe of FIGURE 5; and FIGURE 7 is a transverse sectional view taken on line 7—7 of FIGURE 6.

Refer now to the drawings which illustrate in FIGURES 1 through 4, a probe indicated generally at 10. The probe 10 includes an elongated body 12 and a terminal or end portion 14 which is best seen in FIGURES 2 and 3. The probe is formed from a pair of elongated ducts such as a collection tube 16 and a diluent gas supply tube 18 which extend parallel to one another throughout the length of the probe and are suitably secured in any convenient manner to a support or mounting block which is indicated in semidiagrammatic form at 20. The tube 18 passes through block 20 and is suitably connected to a source of a diluent gas 22 which is maintained at a relatively low temperature. While the diluent gas which is transferred from the source 22 through the duct 18 may be held at any relatively cool temperature, it can conveniently be supplied at approximately 60° F.

As clearly shown in FIGURE 1, the upward end of the duct 16 is connected to a vacuum pump 23. Suitably connected to the lower ends of the tubes 16 and 18, as by a soldered joint, is a mixing means such as a mixing chamber 26 composed of a cylindrical tube which is open at one end 28 and is closed at the opposite end by an end wall 30. The ends of tubes 16 and 18 open into the chamber 26 at 32 and 34, respectively. The tube 16 terminates on the side wall of the mixing chamber 26 near the closed end thereof and the diluent gas supply tube 18 terminates near the open end of the mixing chamber 26. Mounted within the collection tube 16 is a smaller tubule 35 including an end portion 35a which bends toward the open end of the mixing chamber 26. Mounted concentrically within and spaced from the walls of the tubules 35 and 18 are thermocouples 33 and 37, respectively, of suitable known construction. In thermocouples 33 and 37 each include a casing formed from ceramic elements 33a and 37a, respectively, and thermocouple wires 33b and 37b, respectively, which meet at thermocouple junctions of known construction. The duct 16 is connected to a vacuum pump 23 as shown in FIGURE 1. The duct 35 is connected to a pump or vacuum means 35c and to a gas analyzer 35d of any convenient and well-known type, such as a thermal conductivity bridge.

Positioned in parallel relationship with the tubes 16 and 18 and extending the full length of the probe are a plurality of parallel tubules 40 which define a cooling jacket for the probe. As clearly shown in the figures, the tubules 40 extend downwardly on one side of the probe, bend around the lower aspect of the mixing chamber 26 at 42 and then follow the other side of the probe to the mounting block 20. Within the mounting block 20 is provided a manifold (not shown) to which the tubules 40 are connected. As shown in FIGURE 1, water or other cooling medium is fed to the manifold through an inlet line 44 and is exhausted from a line 46 communicating with the other end of each of the tubules. The tubules 40 are themselves secured to each other and to the mixing chamber 26 by a suitable fastening means, such as a soldered connection.

Rigidly mounted within the open end of the mixing chamber 26 is a gas distribution means or transpiration ring 50 which has the shape of an hourglass as seen in longitudinal cross-section. Specifically, the ring 50 includes two annular and preferably frustoconical walls of uniform thickness 52 and 54 which are integrally related and intersect at their small ends to define the inlet port 56. In this manner, an annular space 58 is defined between the wall of the ring 50 and the side wall of the mixing chamber 26; and it is through this annular space that the open end 34 of the diluent gas supply duct 18 communicates with the mixing chamber 26.

As is clearly shown in FIGURE 4, a millivolt meter 60 is wired to the thermocouple 33 by means of conductors 62 and 64 while the thermocouple 37 is wired to a millivolt meter 66 by means of conductors 68 and 70.

While the materials from which the probe is constructed can vary depending upon the requirement of the particular application involved, the tubules 40 can conveniently be formed from stainless steel tubes approximately .045 inch in outside diameter. The mixing chamber 26 can be formed from a tube of stainless steel having an inside diameter of .18 inch and the distribution ring 50 can conveniently be formed from a sintered stainless steel body having continuous pores running therethrough.

The operation of the apparatus of FIGURES 1 through 4 will now be described. To begin operation, a cooling liquid such as water is fed in through the duct 44 and exhausted through duct 46 until all of the tubules 40 are filled with cooling liquid. Gas is then admitted from source 22 through the line 18 into the annular chamber 58 surrounding the transpiration ring 50.

The diluent gas flowing into the annular chamber 58 will pass through the ring 50 throughout its entire surface. A portion of the diluent gas will flow through the frusto-conical section 54 into the surrounding environment but some of it will be carried into the mixing chamber along with the heated gas drawn through inlet port 56 from the environment in which the probe is used. The flow rate of diluent gas is sufficiently great to permit a substantial portion of the heat conducted toward the wall 54 to be returned to the mixing chamber through port 56 with the diluent gas. Because of this regenerative mode of energy transfer, the mixture of heated gas and diluent gas that enters the mixing chamber 26 will lose only a negligible proportion of its energy to the probe walls. Sufficient diluent gas is, of course, added so that the mixture which passes through port 56 is cooled to the point that the thermocouples may conveniently sense the temperature thereof.

When the external conditions are sufficiently severe, the tubules 40 can, if desired, be made or interspersed with a porous material which will allow transpiration cooling of the entire probe to provide the required added protection.

Refer now to FIGURES 5, 6 and 7 which illustrate another probe 80 embodying the present invention. The probe 80 includes an elongated shaft 82 formed from a plurality of parallel longitudinally extending tubules 84 arranged to form a cylindrical cooling means or jacket. The tubules 84 are secured together in any suitable manner, as by soldering. The probe 80 also includes a head portion 86 best seen in FIGURES 6 and 7. The end of the probe opposite the head 86 is secured to a mounting bracket 87. Provided within the mounting bracket 87 is a manifold (not shown) for supplying a cooling medium circulated through the tubules 84.

As clearly shown in FIGURE 5, each of the tubules 84 extends to the head 86 and is bent at 88 back toward the mounting bracket 87 and is positioned parallel to the portion of each tubule leading to the head 86. In this manner, a portion of each tubule brings cooling medium to the head 86 and a portion of each tubule carries the cooling liquid away from the sensing head 86.

At the center of the bends 88 in the tubules 84 is an inlet opening or port 90 through which gas is taken into the sensing head 86 as will be described more fully hereinbelow. Mounted concentrically in the center of the tubules 84 is a relatively large collecting tube 92 within which is mounted a thermocouple 94 of a suitable known construction preferably including a ceramic casing 96 and a pair of conductors 98 and 100 which form a junction 102 spaced somewhat inwardly from the open end 93 of the tube 92.

Positioned between the tube 92 and the jacket defined by the tubules 84 are a plurality of longitudinally extending and radially spaced tubules 104 which function to supply a diluent gas to the inlet of the probe 80. The tubules 104 bend centrally and terminate in openings 106 which are positioned within a mixing space at the end of tube 92. Positioned adjacent to the tubules 104 and extending longitudinally of each is a temperature sensing means such as a thermocouple 110. As shown in FIGURE 7, each of the thermocouples 110 includes a jacket formed from a ceramic material 112 and a pair of conductors 114 and 116 therein which meet at a junction 118. The thermocouples 110 can be bonded to the tubules 104 in any suitable manner as by means of an adhesive 120.

While the several parts of the probe 80 can be formed from a variety of material depending upon the circumstances encountered during use, the tubules 84 are preferably formed from stainless tubing about .01 inch in diameter and can be secured together by means of solder or the like. The tube 92 can be formed from stainless steel tube with an inside diameter of .03 inch. The overall diameter of the probe will then be on the order of about $\frac{1}{10}$ of an inch.

The operation of the apparatus as illustrated in FIGURES 5 through 7 is generally similar to the operation of the apparatus of FIGURES 1 through 4. During operation, a diluent gas, which preferably comprises a noble gas such as helium, is supplied through the tubules 104 while a cooling medium such as water is simultaneously circulated through the outer cylindrical jacket of the probe defined by the tubules 84. The temperature of the diluent gas is recorded continuously by means of the thermocouples 110. The end of the tube 92 adjacent the bracket 87 is connected to a suitable source of vacuum and to a gas analyzer, neither of which are shown, which can be identical with the units 35d and 35c of FIGURE 1. The gas analyzer is operated while the vacuum means draws the mixture of gases from the area of the port 90 into the tube 92. Gas in the region of the port 90 and in the area between the openings 106 of the tubules 104 is drawn into the opening of the pipe 92. Since the diluent gas supplied through the tubules 104 is at a considerably lower temperature than the gas surrounding the probe 80, the mixture of gases entering the pipe 92 will be at a substantially lower temperature than the ambient gas. This gas mixture will pass over the thermocouple 94 which serves to sense the temperature thereof. The temperature of the diluent gas, the mass thereof and the mass of the mixture taken in through the pipe 9 together with its temperature are recorded and employed for calculating the enthtalpy of the ambient gas as described below.

Since in the apparatus of FIGURES 5, 6 and 7, the temperature of the diluent gas is not measured directly, the probe can in general be made in a smaller size than that of FIGURES 1 through 4. Moreover, the apparatus of FIGURES 5, 6 and 7 does not require the use of a porous nozzle similar to the member 50 of the embodiment of FIGURES 1 through 4. It is therefore less costly to construct.

An apparatus embodying the present invention was operated to measure the temperature of gases on the order of 10,000 F. The apparatus proved to be reliable in operation, rugged in construction and suffered substantially no damage from the high heat.

In any measurements in hot gases with a cooled probe, heat transfer errors are always a potential source of difficulty. The most apparent of these in the present device is due to the heat transferred from the hot gas to the porous distribution ring that is not picked up again by the diluent gas entering the probe. If the diluent flow rate is sufficiently high, this will not cause an error. A second source of error lies in the possibility of nonuniform mixing such that the gas passing over the thermocouple 33 is not representative of the total sample. Small dimensions, high temperatures and turbulent mixing (which occurs in the apparatus of the present invention) will tend to minimize stratification that would lead to error.

Since the temperature of the mixture is measured from the gas taken for example through a relatively small tube 35, complete homogeneous mixing of the hot and cold gases within the mixing chamber is not essential. Moreover, the accuracy of the readings is improved over some of the prior art devices since the sensing thermocouple 33 and gas analyzer are exposed to the same gas mixture. The probe 10, moreover, can be transpiration cooled since the diluent gas which is lost to the surroundings does not affect the measurements taken with the probe.

The data which is collected while the probe is in use can be employed for calculating the enthalpy of a gas as follows:

$M_h h_h + M_c h_c = M_m h_m$ Enthalpy balance equation $M_c + M_h = M_m$ Mass balance equation Solving for $h_h$ gives:

$$h_h = h_m + \frac{h_m - h_c}{(M_m/M_c) - 1} \quad (1)$$

where:

$h$ = enthalphy of gas $M$ = mass of gas subscripts:

$h$ = hot gas $c$ = cold gas (diluent)

$m$ = mixture

The enthalpies $h_c$ and $h_m$ are obtained by measuring the temperature of the gas. The mass fraction of diluent in the mixture $(M_c M_m)$ can be obtained with any of several types of gas analyzers. By measuring actual mass fraction, diluent gas lost to the external environment does not affect reading.

In making the measurements, the following assumptions are necessary:

(1) The gas is at equilibrium where the temperature of the mixture, $t_m$, is measured.

(2) The effective Lewis number is one.

An effective Lewis number of one is a good assumption when turbulent mixing occurs. Investigation of temperature and velocity profiles in the mixing region in present tests indicates that this assumption is valid.

Equation 1 gives the hot gas enthalpy in terms of the mass fraction, mixture enthalpy, and diluent enthalpy. Since the actual measurement is temperature, it is useful to rewrite Equation 1 in terms of known quantities.

The specific heat of the mixture can be expressed as:

$$C_m = C_{hm}(1 - M_c/M_m) + C_{cm}(M_c/M_m) \quad (2)$$

where: $C$ = specific heat at constant pressure subscripts:

$hm$ = property of hot gas at mixture temperature $cm$ = property of diluent gas at mixture temperature Equation 1 can be rewritten as follows:

$$h_h = C_m t_m + \frac{C_m t_m - C_c t_c}{(M_m/M_c) - 1} \quad (3)$$

where: $t$ = temperature of gas

Substituting into (3) from (2) above:

$$h_h = C_{hm} t_m + \frac{C_{cm} t_m - C_c t_c}{(M_m/M_c) - 1} \quad (4)$$

If the specific heat, $C_h$, is known, the temperature, $t_h$, can be calculated from enthalpy, $h_h$.

One possible mode of operation when wide pressure variations are present is to maintain the temperature, $t_m$, constant when $t_h$ gets above a certain level. To do this, the diluent can for example be supplied through a metering valve adjusted by the output of the thermocouple measurement, $t_m$. Thus, if $t_h \leq T_m$, where $T_m$ is the set valve of $t_m$, $t_m = t_h$ and the system operates as a normal thermometer. When $t_h > T_m$, $M_m/M_c$ is varied to maintain $t_m = T_m$. If the entering diluent temperature is also constant, then $M_m/M_c$ is the only variable in Equation 4 when $t_h > T_m$. For extremely high temperatures, it is necessary to have an accurate value of $M_c/M_m$. Moreover, the higher the value of $T_m$, the less accuracy required for $M_c/M_m$ at a given gas temperature, $t_h$.

*Example*

An example will now be provided setting forth test data obtained during the use of the invention illustrated in FIGURES 1 through 4. The probe which was employed in the tests had a width (the vertical dimension of FIGURE 3) of .3 inch and the mixing chamber had an internal diameter of .18 inch. The gas analyzer 35d consisted of a meter of the type exemplified by a gas density meter model O–91 manufactured by Gow-Mac Instrument Co., 100 Kings Road, Madison, New Jersey. The plasma was produced with a Plasmatron Model 12.5 manufactured by Plasmodyne Corp., Santa Ana, Calif. The temperature of the water fed to the probe was approximately 60° F. The ambient pressure was about one atmosphere.

The gas upon which measurements were taken consisted of an argon plasma. The diluent gas consisted of helium having a temperature of 62° F. as it entered the mixing chamber 26. The temperature recorded within the mouth of the tube 35 by the thermocouple 33 was 660° F. The mixture of gases collected and transferred through the tube 35 to the gas analyzer 35d was determined to consist of 1.27% argon and 98.73% helium. The temperature of the plasma calculated from this information was 19,700° F.

It is apparent that many modifications and variations of this invention as hereinbefore set forth may be made without departing from the spirit and scope thereof. The specific embodiments described are given by way of example only and the invention is limited only by the terms of the appended claims.

We claim:

1. A temperature sensing probe comprising in combination, an elongated probe body, a jacket defining the exterior of said probe, said jacket being composed of a plurality of tubules extending over the probe, a gas inlet opening in said jacket, a duct means communicating with the area adjacent said inlet opening for supplying a relatively cool diluent gas to the area immediately surrounding the inlet opening and a collection duct means also communicating with the inlet opening for withdrawing a sample of gas mixture composed in part of a gas from the atmosphere within which the probe is placed and also composed in part of the diluent gas through said duct means and a first and second temperature means for sensing the temperature of the diluent gas and the gas passing into the collection duct means, respectively.

2. The apparatus according to claim 1 wherein said temperature sensing means comprises first thermocouple means in heat transfer relationship with the diluent gases supplied therethrough and a second thermocouple means mounted in heat conducting relationship with the gases passing into the collection duct means.

3. A temperature sensing probe comprising in combination a cooling jacket composed of a plurality of parallel longitudinally extending tubules positioned adjacent one another in tangential abutting relationship, a bonding material between the tubules and extending the length thereof for holding the tubules together, each of the tubules including a first portion extending toward one end of the probe, a bend at the end of the first portion and a second portion extending away from said one end of the probe, a supply duct means within said jacket for supplying a diluent gas to said one end of the probe, a collection duct means communicating with said one end of said probe for withdrawing a gas to be analyzed, and a means for sensing the temperature of the collected sample and the temperature of the diluent gas provided through said supply duct.

4. A temperature sensing probe comprising in combination a probe body, said body having an inlet port therein, a supply means extending through the probe for feeding a diluent gas to the end of the probe adjacent the inlet port, a collection means also extending through the probe and terminating within the probe at a distance from the inlet port, and a foraminous member adjacent the inlet port communicating with the end of the supply means, the diluent gas fed through said supply means thereby passing through the foraminous member and the transpiration of diluent gas through the foraminous member being adapted to cool the surface thereof.

5. The apparatus of claim 4 wherein the foraminous member extends around the outside of the inlet opening.

6. A temperature sensing probe comprising in combination an elongated probe body, said probe body having an inlet port therein at one end thereof, a supply duct means extending through the probe for feeding a diluent gas to a portion of the probe positioned inwardly of the inlet port, a collection duct also extending through the probe and terminating within the probe adjacent the inlet port, a formaminous transpiration member communicating between the end of the supply duct means adjacent the inlet port and the collection duct, said diluent gas supplied through said supply means being thereby adapted to pass through the foraminous member and the transpiration of said diluent gas through the foraminous member being adapted to cool the surface thereof, said foraminous member having a portion thereof extending around said opening and comprises an exterior wall of said probe and a portion of the diluent gas forced therethrough being drawn in through the inlet opening and into the collection duct as a gas sample is collected.

7. A temperature sensing probe comprising in combination an elongated probe body means, a means for cooling the exterior of the probe body, said probe body having an inlet therein for collecting a sample of gas to be tested, a supply means extending through the probe body for supplying a diluent gas to the inlet port, a collection means extending through the probe for collecting a sample of the gas within the probe adjacent the inlet port, a foraminous transpiration cooling means interposed between the means for supplying diluent gas and the inlet port, the sample taken into the collection means being thereby composed in part of a diluent gas expelled through the transpiration cooling means and the heat of the gas mixture drawn in through the inlet port being adapted to increase the temperature of the diluent gas fed through said supply means to regeneratively heat the diluent gas and provide a gas mixture of a relatively uniform temperature.

8. The apparatus according to claim 7 wherein the transpiration cooling means comprises a foraminous member positioned between the end of the supply means and the outside surface of the probe adjacent the inlet port.

9. The apparatus according to claim 8 wherein the foraminous member includes an annular poriton extending entirely around the inlet port.

10. The apparatus according to claim 8 wherein a mixing chamber communicates with the diluent gas supply means and the gas collection means and wherein said foraminous member comprises a ring having the general shape of an hourglass in longitudinal section including a pair of integral frusto-conical portions, said inlet port being denfied by the intersection of said frusto-conical portions and the supply means communicating with the mixing chamber through the foraminous member.

11. A temperature sensing probe comprising in combination an elongated probe body means, a longitudinally extending duct means for cooling the exterior of the probe body, said probe body having an inlet therein for collecting a sample of gas to be tested, a first means extending through the probe body for supplying a diluent gas to the portion of the probe adjacent the inlet port, a second means extending through the probe for collecting a sample of the gas within the probe adjacent the inlet port, a foraminous transpiration cooling means interposed between the first means and the inlet port, the gas collected through the second means being thereby composed in part of diluent gas expelled through the transpiration cooling means and in part of gas surrounding the probe, the heat of the gas drawn in through said inlet port being adapted to heat the diluent gas supplied through said first means to thereby regeneratively heat the diluent gas and provide a gas mixture of a relatively uniform temperature, a mixing chamber communicating between the first means and the second means and said foraminous member comprising a ring including a pair of integral annular portions which meet to define said inlet port and the first means communicating with a mixing chamber through the foraminous member.

12. A process for sensing the temperature of a heated gas with an elongated probe having an opening therein comprising supplying a relatively cool diluent gas to the portion of the probe adjacent said opening, withdrawing a mixture of the diluent gas and heated gas occupying the space surrounding the probe, expelling a portion of the diluent gas supplied to the area adjacent the inlet port into the space outside of the probe immediately surrounding said inlet port, drawing a fraction of the gas mixture surrounding said inlet port into the probe, sensing the temperature of the diluent gas supplied to the area adjacent said inlet opening and sensing the temperature of the gas mixture withdrawn through the probe.

13. A process for sensing the temperature of a heated gas with a probe having an opening therein and a foraminous transpiration means comprising supplying a relatively cool diluent gas to the portion of the probe adjacent said inlet opening, expelling a portion of the diluent gas which is supplied to the area adjacent the inlet opening through the foraminous transpiration means and into the region outside of the probe immediately surrounding said inlet opening, withdrawing a fraction of the gas mixture surrounding said inlet port through the probe for sampling, measuring the relative amounts of diluent gas and heated gas thus withdrawn, sensing the temperature of the diluent gas supplied to the area adjacent said inlet opening and sensing the temperature of the gas mixture withdrawn from the probe, the diluent gas thereby being regeneratively heated to insure thorough mixing of said heated gas and said diluent gas.

References Cited by the Examiner
UNITED STATES PATENTS

| | | | |
|---|---|---|---|
| 3,167,956 | 2/1965 | Grey | 73—190 |
| 3,181,363 | 5/1965 | Edmonson | 73—339 |

LOUIS R. PRINCE, *Primary Examiner.*

DONN McGIEHAN, *Assistant Examiner.*